United States Patent [19]
McWeeny et al.

[11] Patent Number: 6,052,578
[45] Date of Patent: Apr. 18, 2000

[54] METHOD FOR CONVERTING CONTENTION BUSIED CALLS IN A WIRELESS COMMUNICATION SYSTEM

[75] Inventors: David E. McWeeny, Buffalo Grove; Stephanie L. Wasserberg, Chicago; Jerald M. Gard, Algonquin, all of Ill.

[73] Assignee: Motorola, Inc., Schaumburg, Ill.

[21] Appl. No.: 08/879,948

[22] Filed: Jun. 20, 1997

[51] Int. Cl.[7] .................................................. H04B 1/00
[52] U.S. Cl. ....................... 455/414; 455/528; 455/510; 455/519
[58] Field of Search ...................... 455/528, 509, 455/510, 514, 512, 516, 518, 519, 414, 416, 426; 379/241, 93.35, 215, 266, 309; 370/376

[56] References Cited

U.S. PATENT DOCUMENTS

| | | | |
|---|---|---|---|
| 4,977,589 | 12/1990 | Johnson et al. | 455/403 |
| 5,287,551 | 2/1994 | Gustafson, Jr. et al. | 455/509 |
| 5,287,552 | 2/1994 | Sasuta et al. | 455/518 |
| 5,420,909 | 5/1995 | Ng et al. | 455/426 |
| 5,423,061 | 6/1995 | Fumarolo et al. | 455/519 |
| 5,530,914 | 6/1996 | McPheters | 455/518 |
| 5,537,684 | 7/1996 | Cassidy et al. | 455/512 |
| 5,541,924 | 7/1996 | Tran et al. | 370/347 |
| 5,542,108 | 7/1996 | Sasuta | 455/520 |
| 5,678,190 | 10/1997 | Ishida et al. | 455/516 |
| 5,754,627 | 5/1998 | Butler et al. | 455/414 |
| 5,794,154 | 8/1998 | Bar-On et al. | 455/509 |
| 5,812,649 | 9/1998 | Shen | 379/142 |
| 5,905,960 | 5/1999 | Nicholl et al. | 455/450 |

*Primary Examiner*—William G. Trost
*Assistant Examiner*—Sonny Trinh
*Attorney, Agent, or Firm*—Susan L. Lukasik; Steven R. Santema

[57] ABSTRACT

Upon detecting a contention between a call request and an active call (404), the call request is added to a busy queue as a contention busied call (412) and at least one logical link is created between the busied call and the active call(s) giving rise to the contention (414). When the active call(s) terminate (502), the at least one logical link is used to identify those busied calls that may be converted to active calls (514), thereby reducing delays associated with the conversion of contention busied calls.

23 Claims, 6 Drawing Sheets

— PRIOR ART —

METHOD FOR CONVERTING CONTENTION BUSIED CALLS IN A WIRELESS COMMUNICATION SYSTEM

FIELD OF THE INVENTION

The present invention relates generally to wireless communication systems and, in particular, to the conversion of contention busied call requests to active calls.

BACKGROUND OF THE INVENTION

Call requests in wireless communication systems are generally known, including private call requests and talkgroup call requests. A private call request results when a user of a given communication unit (e.g., a hand-held portable or in-car mobile radio) wishes to communicate with another user on another communication unit. The call is "private" in the sense that no other users are allowed to participate in the requested communication. Talkgroup call requests result when a member of a talkgroup (a logical grouping of individual communication units) wishes to communicate with the other members of that talkgroup. If granted, the talkgroup call request allows all members of the talkgroup to participate in and monitor the communication. Also, a multigroup call request occurs when a member of a multigroup (a logical grouping of multiple talkgroups) attempts to communicate with the other members of the multigroup, including members of talkgroups which may currently be engaged in a talkgroup call. The resulting multigroup call allows all members of the multigroup and the targeted talkgroup to participate in and monitor the multigroup call. When a call request is granted, the resulting call is termed an "active call".

However, there are instances (for example, in wide-area multi-site communication systems such as SMARTZONE systems by Motorola, Inc.) in which call requests may not be immediately granted. Such call requests are termed "busied calls" and placed into a "busy queue". Typically, busied calls result from one of two conditions. In the first condition, a busied call will result if there are insufficient resources (e.g., wireless communication channels, or infrastructure-based resources) available to complete the requested service at the time of the call request, referred to as a resource busy. Until sufficient resources become available, the busied call remains in the busy queue. In the second condition, a busy call results because a contention condition exists between a party targeted in the call request and an active call or a previously busied call, referred to as a contention busy. That is, the called (targeted) party in the call request is currently engaged in an active or busied call and is therefore unable to participate in the requested call. As described below, prior art methods of converting busied calls to active calls (often referred to as a "busy conversion") address the first condition, but not the second.

Figure 1:
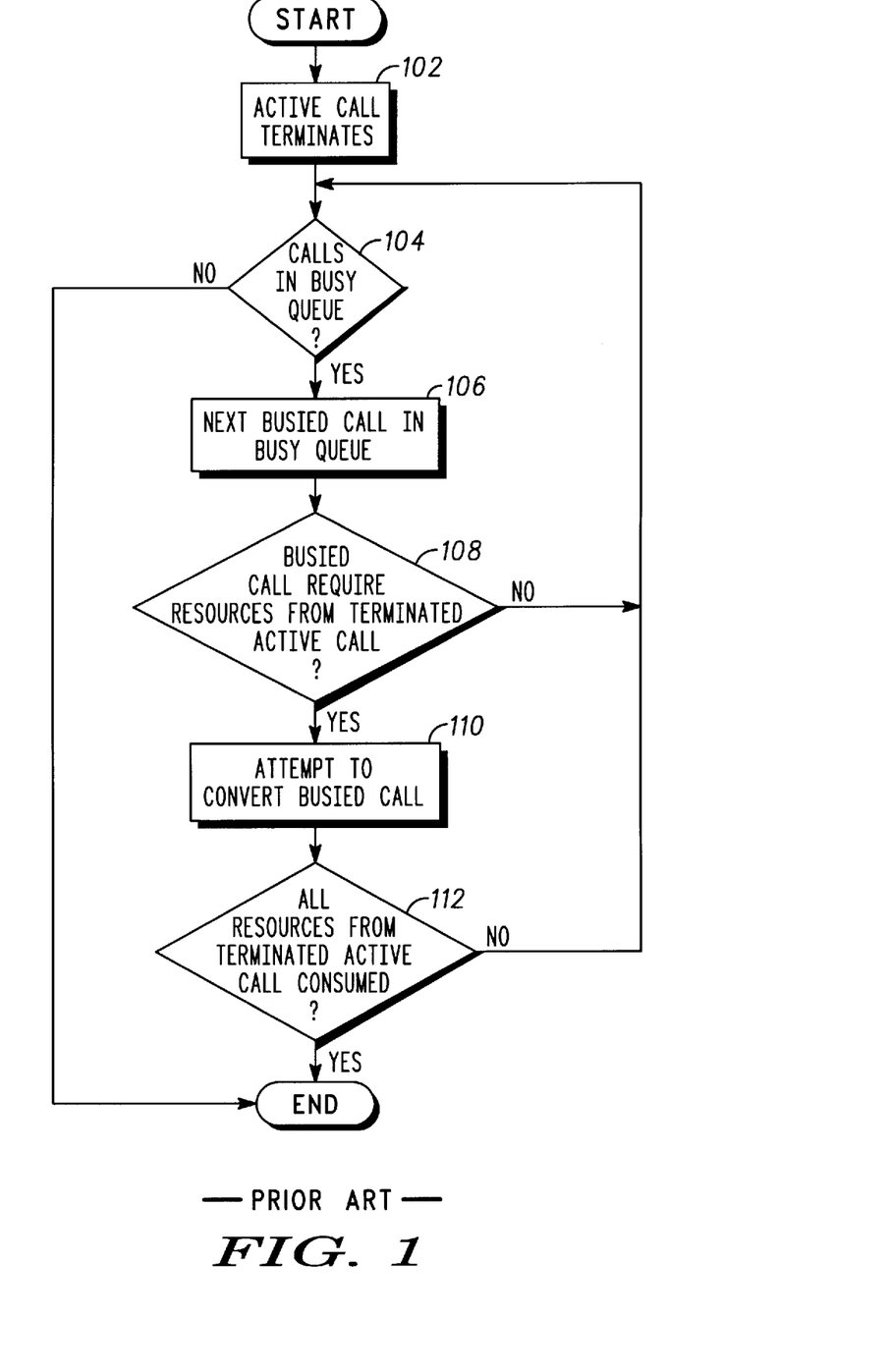
FIG. 1 is a flowchart illustrating handling of busy conversions in accordance with prior art techniques.

FIG. 1 illustrates the prior art method for busy conversions. When an active call terminates at step 102, a check is made of the busy queue at step 104 to see if there are currently any busied calls. If so, the next busied call in the queue (according, first, to service or unit priority and, second, to duration within the queue) is accessed at step 106 and, at step 108, it is determined whether the busied call, in order to be converted to an active call, requires any of the resources previously used by the now-terminated active call. If so, the busied call is converted, if possible and in accordance with well-known techniques, to an active call at step 110. The process of attempting to convert busied calls continues until it is determined that there are no more busied calls in the busy queue (step 104) or until it is determined that the resources made available by the terminated call have been consumed in the process of converting busied calls (step 112). An example of this process, and its inherent shortcomings, is illustrated in FIG. 2.

Figure 2:
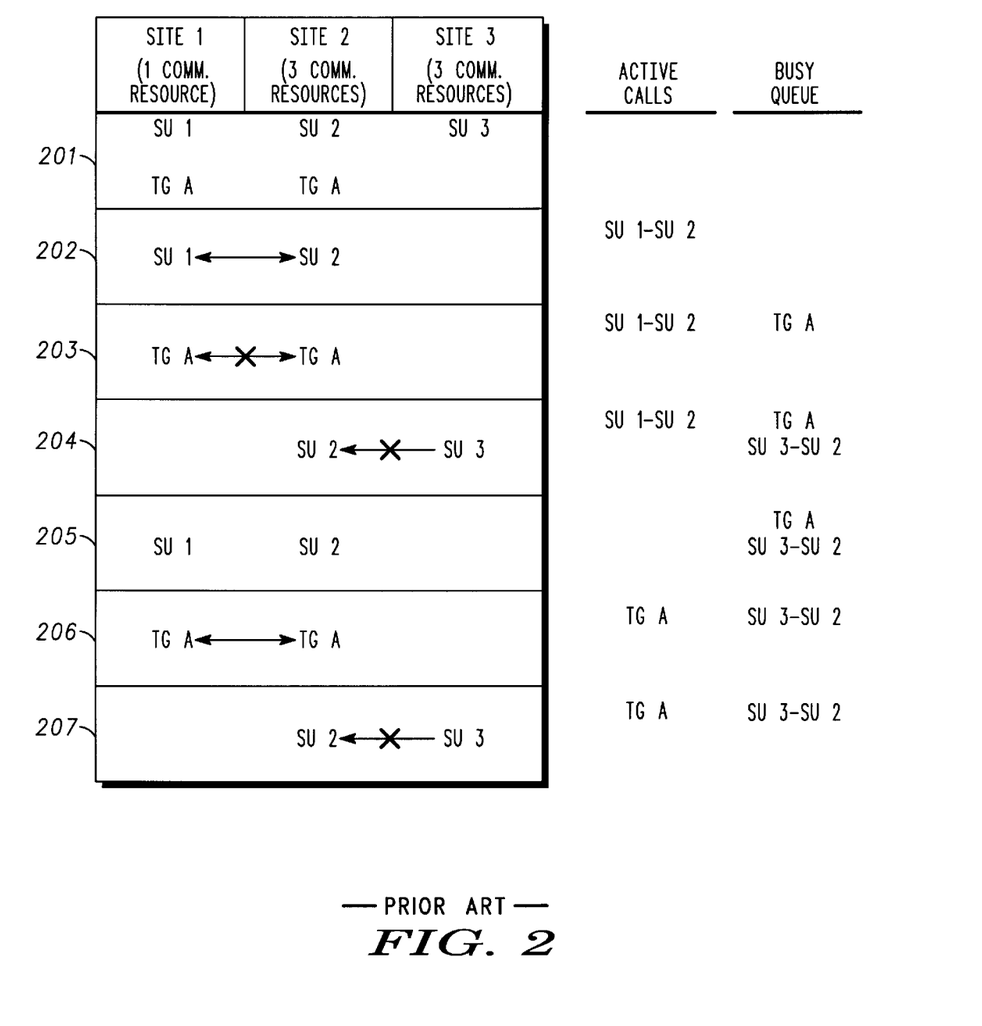
FIG. 2 illustrates an example of busy conversion in accordance with the prior art techniques illustrated in FIG. 1.

FIG. 2 illustrates the progression of various active and busied calls in accordance with the method of FIG. 1. In FIG. 2, the progression of time is illustrated from top to bottom and, in the example shown, it is assumed that the system comprises three sites; Site 1 has one communication resource available; Sites 2 and 3 have three communication resources available, respectively. Initially 201, one of three communication units (SU 1, SU 2, SU 3) is registered at each site, as shown. Additionally, there is a talkgroup (TG A) with members registered at Sites 1 and 2, which members are not communication units SU 1 and SU 2. Subsequently 202, the first communication unit (SU 1) calls the second communication unit (SU 2) resulting in the active call (SU 1-SU 2) shown in the active calls column; the sole resource available at Site 1 is used by this active call.

When a talkgroup call request is made 203 requiring resources in Sites 1 and 2, it is busied and placed in the busy queue (shown as TG A in the busy queue column) because there are insufficient resources available at Site 1. Also, when a private call request is made 204 by the third communication unit (SU 3) targeting the second communication unit (SU 2), it is denied not because of insufficient resources (Sites 2 and 3 have sufficient resources available), but because the second communication unit is currently involved in an active call thereby creating a contention busy. Thus the private call request is placed in the busy queue, shown as SU 3-SU 2 in the busy queue column. When the active call later terminates 205, it is removed from the active call column, and the busy queue is checked to see if any busied calls can be completed using the recently-released resources. Thus, it is determined that the busied call corresponding to the talkgroup call request can proceed because the necessary resources are now available at Site 1; it is removed from the busy queue and placed 206 in the active call column.

At this point, it is evident that the other busied call in the busy queue (SU 3-SU 2) should be able to proceed because the contention condition no longer exists and there are sufficient resources available to complete the call. However, because all of the recently-released resources have been consumed (or, in practice, because the busied call does not require any of the recently-released resources), the busied call will not be converted 207 to an active call. In effect, the prior art method is not capable of differentiating between a resource busy and a contention busy and, as a result, will cause busied calls that might other wise be converted to remain in the busy queue. The delays due to this failure to convert busied calls results in user dissatisfaction with system performance. Thus, a need exists for a method of converting busied calls that is capable of handling contention busied calls.

DESCRIPTION OF PREFERRED EMBODIMENT

The present invention provides a method for the conversion of busied calls which accommodates the occurrence of contention busied calls in addition to resource busied calls. When a contention is detected for a call request, at least one logical link is created between the busied call and the active call(s) giving rise to the contention. When the active call(s) terminate, the at least one logical link is used to identify those busied calls that may be converted to active calls. These techniques may be applied to any type of call request, including private call requests, talkgroup call requests, and multigroup call requests. In this manner, the likelihood of delays in converting contention busied calls is reduced, thereby resulting in improved system performance.

Figure 3:
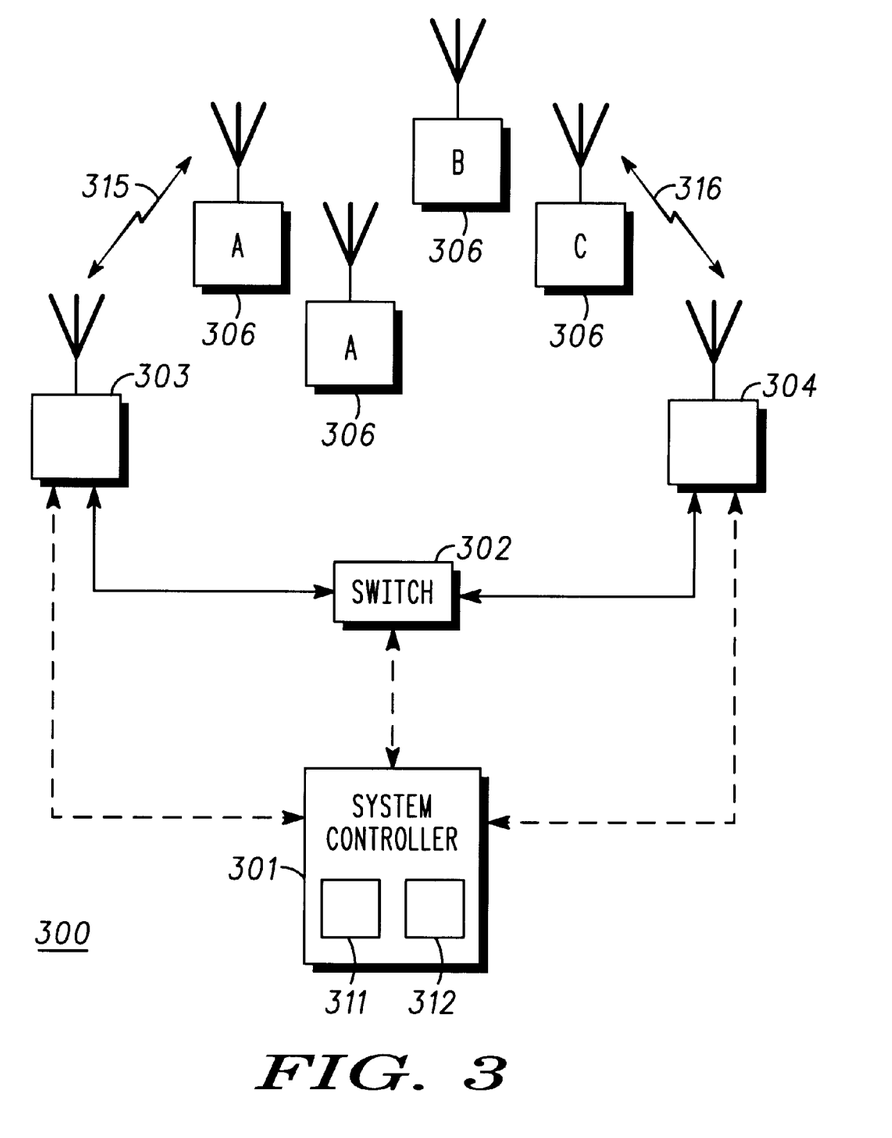
FIG. 3 is a block diagram of a wireless communication system in which the present invention may be beneficially applied.

The present invention may be more fully described with reference to FIGS. 3–6. FIG. 3 is a block diagram of a wireless communication system 300, such as a SMART-ZONE system by Motorola, Inc., comprising a system controller 301, a switch 302, base sites 303–304 and a plurality of communication units 306. The system controller 301, such as a SMARTZONE Zone Controller by Motorola, Inc., further comprises a computing platform 311 and memory 312 as known in the art. The methods described and claimed hereinafter are preferably implemented as software routines stored in the memory 312 and executed by the computing platform 311, although it is understood that other implementations are possible. Through the use of control signaling, the system controller 301 manages operation of the system 300 via control links (shown as dotted lines) with the switch 302 and base sites 303–304. In particular, the system controller 301 handles all requests for communications within the system 300.

Each base site 303–304 preferably comprises one or more trunked radio frequency (RF) transceivers (such as QUANTAR or INTELLIREPEATER stations by Motorola, Inc.) and associated site management equipment operating under the control of the system controller 301. The base sites 303–304 exchange information (comprising audio, and possible data, information) via the switch 302 (such as an Ambassador Electronics Bank by Motorola, Inc.) using non-control links (shown as solid lines). Additionally, the base sites communicate with the plurality of communication units 306 via communication resources 315–316. The communication resources 315–316 may comprise time-division multiplexed, frequency-division multiplexed, or code-division multiplexed RF carrier frequencies.

The communication units 306, such as SABER mobile and portable radios by Motorola, Inc., are capable of private calls as well as group communications. As such, each of the communication units 306 has an individual unit identification (ID) associated therewith, and may also have at least one talkgroup ID and at least one multigroup ID associated therewith. In the example of FIG. 3, the communication units 306 are logically grouped into talkgroups; talkgroup A has two members shown, and talkgroups B and C each have a single member shown. Additionally, the separate talkgroups can be logically grouped together to form a multigroup. Because the individual communication units can roam between sites, a given talkgroup may have individual members spread across many sites. For the purposes of the present invention, communication entities are considered to be any actual (e.g., communication units) or logical (e.g., talkgroups, multigroups) entities that are allowed to make communication requests. As described below, the present invention is equally applicable to call requests made on a private, talkgroup, or multigroup basis.

Figure 4:
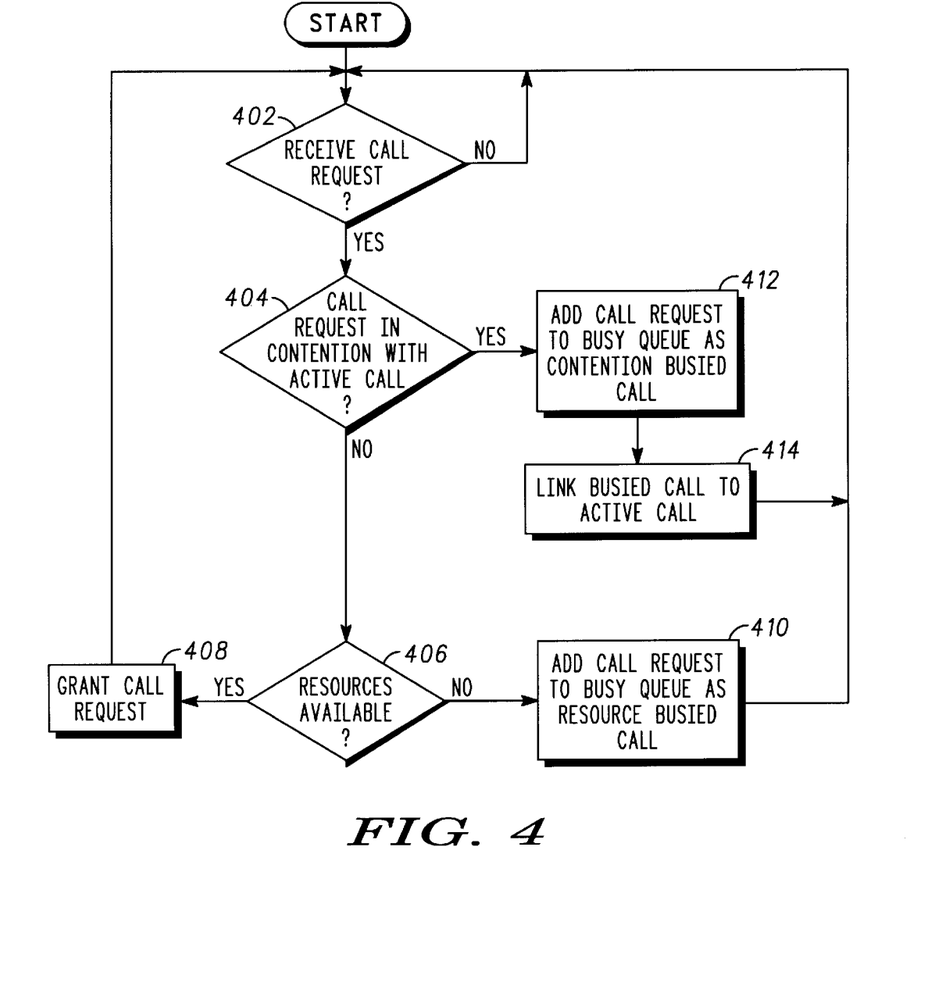
FIG. 4 is a flowchart illustrating handling of busied calls in accordance with the present invention.

Referring now to FIG. 4, a method is illustrated for the handling of busied calls in accordance with the present invention. The method described with reference to FIG. 4 is preferably implemented via a system controller, although other implementations may be possible. Receipt of call requests is monitored at step 402. When a call request is received, it is first determined whether the call request is in contention with an active call at step 404. A contention condition exists if a called entity, i.e., the entity with which the calling entity desires to establish communications, is currently participating in an active call. Thus, when a private call request is made, contention will exist when the communication unit designated as the target of the call request is already engaged in an active call. Likewise, when a talkgroup or multigroup call request is made, contention will exist if the talkgroup designated as the target of the call request is already engaged in an active call. It is further understood that the present invention could be extended to other types of contention conditions.

If no contention is detected, it is determined at step 406, in accordance with well-known prior art techniques, whether sufficient resources are available to complete the call request. If so, the call request is granted at step 408 resulting in an active call stored within memory of the system controller. If sufficient resources are not available, the call request is added, at step 410, as a resource busied call to a busy queue within memory of the system controller. Whether an active call or a busied call, each call request handled by the system controller has associated with it a call record. A call record is a data structure stored within the system controller's memory which minimally lists the following: identifications of the communication units, talkgroups and/or multigroups involved in the call; the status of the call as either active, busy due to resources, or busy due to contention; the communication resources either currently used by the call or required to complete the call. Additionally, as described below, a call record for a contention busied call will also include space for the creation of at least one logical link to at least one other call record.

Assuming that a contention condition was detected at step 404, the call request is added 412 as a contention busied call to the busy queue. Additionally, at step 414, the contention busied call is logically linked to the one or more active calls giving rise to the contention condition. That is, some indication, either direct or indirect, is created such that the system controller can later determine precisely which active and busied calls are currently in contention. The present invention envisions several embodiments for such logical links.

In a first embodiment, a logical link comprises a general contention indication in the call record for the active call(s) giving rise to the contention indication. Such a general contention indication would comprise a known code or similar device stored in the call record(s). Thus, when the active call(s) terminates, the system controller will detect the general contention indication and ascertain which contention busied calls, if any, may be converted as a result of the termination.

Before describing the remaining embodiments for the logical links, it is helpful to note that in addition to call records, the system controller typically also maintains what can be described as entity records. For the purposes of the present invention, an "entity" is any communication unit, talkgroup or multigroup capable of issuing a call request and/or being included as the target of a call request. Like call records, each entity record is a data structure stored in the system controller's memory that includes information necessary for proper operation of the system. Of importance to the present invention, each entity record includes space allowing for the creation of logical links.

In a second embodiment, a logical link comprises a pointer (as known in the art) stored in the call record of each active call giving rise to the contention, which pointer ultimately points to the call record for the contention busied call stored in the busy queue. Thus, the pointer in the active call's call record can point directly to the contention busied call's call record. Alternatively, the pointer in the active call's call record can point to entity records which in turn point to the contention busied call's call record. For example, assume multigroup X attempts to establish communications with talkgroup Y, but that the call request gives rise to a contention busied call (having associated therewith call record C) because talkgroup Y is currently engaged in an active call (having associated therewith call record A). A pointer in the call record A for the active call can be created which directly points to the call record C for the contention busied call. In the alternative, intermediate entity records may be used to create a "daisy chain" of pointers leading to the call record C for the contention busied call. Continuing with the previous example, a pointer in call record A for the active call can point to the entity record for talkgroup Y, which in turn can point to the entity record for multigroup X, which in turn can point to the call record C for the contention busied call.

The third embodiment of the logical link is essentially a subset of the second embodiment described above. That is, a pointer, or daisy chain of pointers, is established starting with the entity record for the called entity giving rise to the contention that ultimately points to the call record for the contention busied call.

Finally, in the fourth embodiment, a logical link comprises a pointer stored in the call record of the contention busied call stored in the busy queue, which pointer ultimately points to the call record for each active call giving rise to the contention. As in the second embodiment, the pointer(s) in the contention busied call's call record may directly point to the active call(s), or they may be at the head of a daisy chain of pointers pointing to the active call(s). The embodiments described above relate to specific implementations of logical links. However, it is anticipated that other implementations of logical links are possible. Regardless, through the use of such logical links, the present invention provides a mechanism through which contention busied calls can be identified and possibly converted to active calls. Such conversions are discussed in greater detail with reference to FIG. 5.

Figure 5:
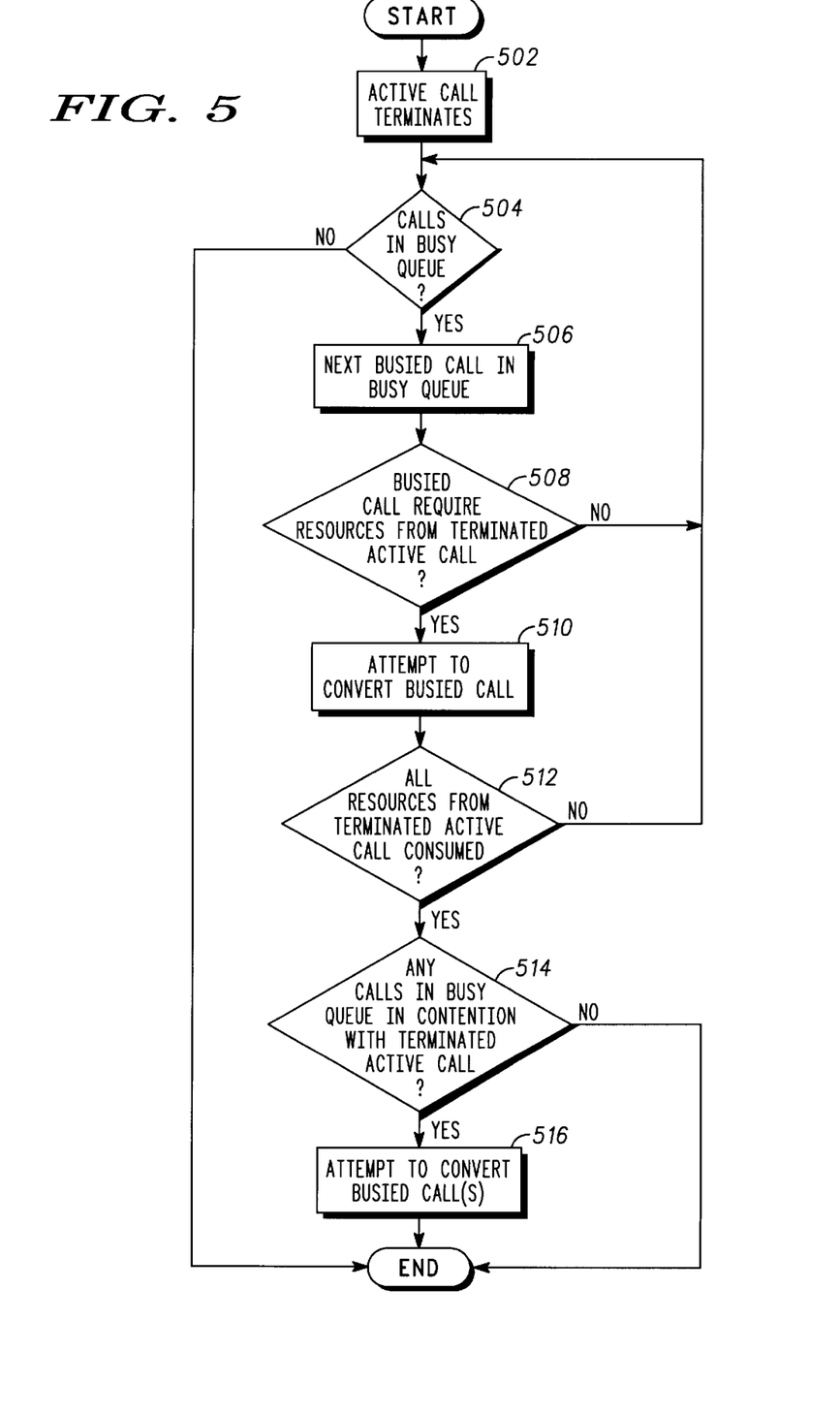
FIG. 5 is a flowchart illustrating handling of busy conversions in accordance with the present invention.

FIG. 5 illustrates a method for converting busied calls to active calls in accordance with the present invention. Steps 502–512 are identical to corresponding steps 102–112 described previously with reference to FIG. 1. That is, upon termination of an active call, resource busied calls in the busy queue are identified that may be converted to active calls in light of the resources freed up due to the termination of an active call. However, the present invention continues at step 514 by determining whether there are any busied calls that were in contention with the now-terminated active call. This determination is made using the logical link previously established for each contention busied call.

If the first embodiment described above for logical links is used, step 514 requires that the system controller inspect the call record for the now-terminated active call. If a general contention indication is detected, the system controller knows to check all contention busied calls in the busy queue to determine which, if any, contention busied calls can be converted to active calls. In this manner, the first embodiment for logical links offers simplicity of implementation at the expense of additional required computations when identifying candidates for conversion from contention busied calls to active calls.

If the second embodiment described above for logical links is used, the system controller will follow the pointer, or daisy chain of pointers, from the call record of the now-terminated active call to the call record(s) for any busied call(s) for which the now-terminated active call created contention. Similarly, if the third embodiment for logical links is used, the system controller will follow the pointer, or daisy chain of pointers, from the entity record of the called entity that was participating in the now-terminated active call to the call record(s) for any busied call(s) for which the now-terminated active call created contention. Both the second and third embodiments increase the complexity of the required logical links in order to gain the benefit of reduced computation when identifying conversion candidates.

Finally, if the fourth embodiment for logical links is used, the system controller will scan the busy queue for contention busy calls and follow the pointer, or daisy chain of pointers, from the call record of any contention busied call to the call record(s) of the now-terminated active call that created contention. Regardless of the particular implementation of the logical links used, any contention busied calls identified at step 514 as having been in contention with the now-terminated active call will be converted to active calls (assuming sufficient communication resources are available) at step 516.

Figure 6:
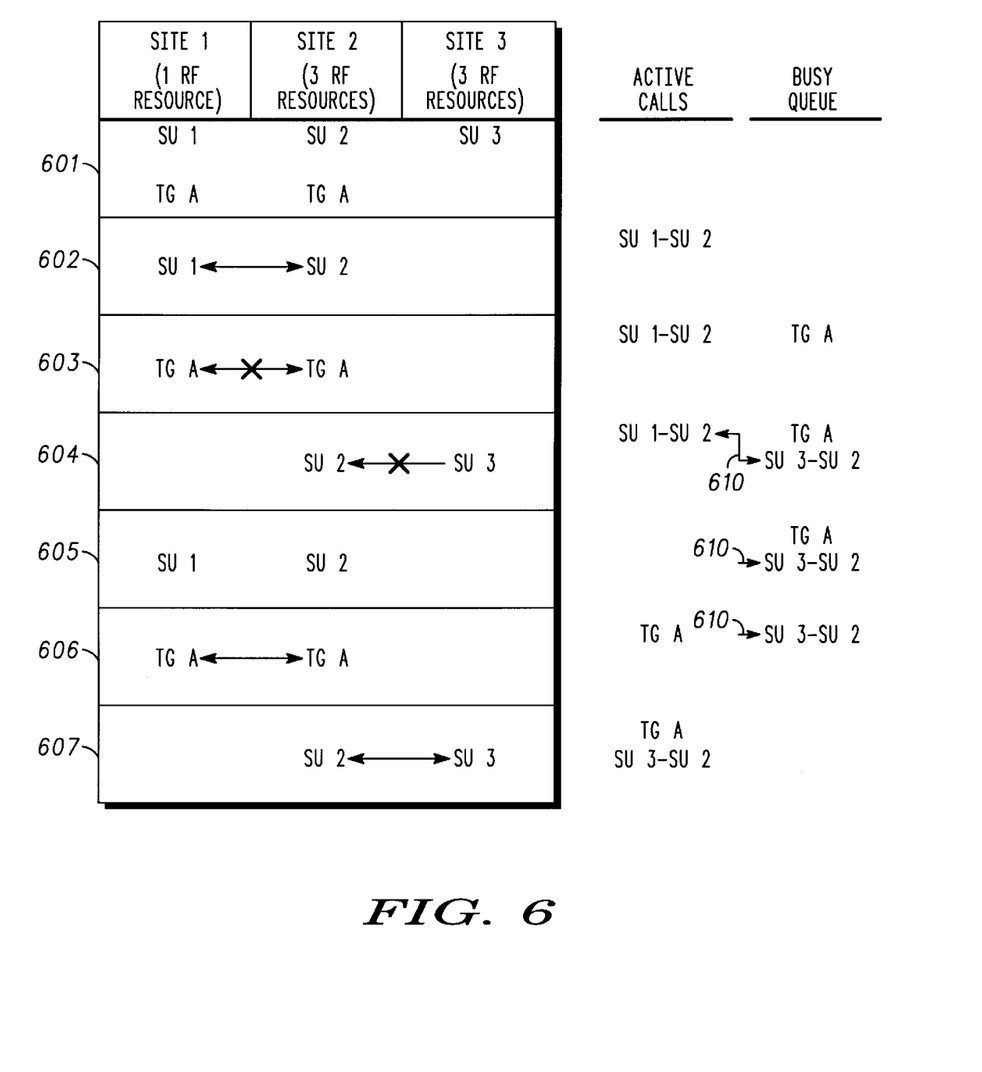
FIG. 6 illustrates an example of busy conversion in accordance with the present invention.

An example of the method described in FIGS. 4 and 5 is shown in FIG. 6. Similar to the example shown in FIG. 2, the progression of time in FIG. 6 is illustrated from top to bottom and it is assumed that the system comprises three sites; Site 1 has one communication resource available; Sites 2 and 3 have three communication resources available, respectively. Events 601–603 progress in the same manner as events 201–203 described above in FIG. 2. However, when the private call request is made 604 by the third communication unit (SU 3) targeting the second communication unit (SU 2), the contention busied call SU 3-SU 2 placed in the busy queue has a logical link 610 established with the active call SU 1-SU 2 that gave rise to the contention. When the active call SU 1-SU 2 later terminates 605, it is removed from the active call column, and the resource busied call (TG A) in the busy queue is converted 606 due to the now-available resources; it is removed from the busy queue and placed in the active call column. Now, because of the logical link 610 between the now-terminated active call SU 1-SU 2 and the contention busied call SU 3-SU 2, the contention busied call SU 3-SU 2 is also identified as a busied call that can be converted 607 assuming that sufficient communication resources are available.

The present invention provides a method for the conversion of busied calls which accommodates the occurrence of contention busied calls in addition to resource busied calls. By creating a logical link between a contention busied call and the active call(s) which gave rise to the contention, the present invention provides a mechanism whereby contention busied calls can be identified and converted to an active status, if possible, upon termination of the contending active call. As a result, delays in processing busied calls may be reduced, leading to improved system performance.

Although the present invention has been described with reference to certain preferred embodiments, numerous modifications and variations can be made by those skilled in the art without departing from the novel scope of the present invention.

We claim:

1. In a wireless communication system, a method for converting a busied call, the method comprising steps of:

detecting that a first active call has terminated;

determining that the first active call was in contention with at least the busied call via at least one logical link; and converting the busied call to a second active call.

2. The method of claim 1, the step of converting the busied call further comprising a step of identifying available communication resources for use in the second active call.

3. The method of claim 1, further comprising the step of determining that the first active call was in contention with at least the busied call, wherein the at least one logical link comprises a general contention indication in a call record for the first active call.

4. The method of claim 1, further comprising the step of determining that the first active call was in contention with at least the busied call, wherein the at least one logical link comprises a pointer in a call record for the first active call that ultimately points to at least a call record for the busied call.

5. The method of claim 1, further comprising the step of determining that the first active call was in contention with at least the busied call, wherein the at least one logical link comprises a pointer in a call record for the busied call that ultimately points to at least a call record for the first active call.

6. The method of claim 1, further comprising the step of determining that the first active call was in contention with at least the busied call, wherein the at least one logical link comprises a pointer in an entity record for a called entity participating in the first active call that ultimately points to at least a call record for the busied call.

7. In a wireless communication system, a method for processing a busied call, the method comprising steps of:

receiving a call request;

determining that the call request is in contention with at least one active call;

placing the call request in a busy queue to produce the busied call; and linking the busied call to the at least one active call via at least one logical link.

8. The method of claim 7, further comprising steps of:

detecting that the at least one active call has terminated; and determining that the busied call was in contention with the at least one active call via the at least one logical link.

9. The method of claim 8, further comprising a step of:

converting the busied call to a second active call.

10. The method of claim 9, the step of converting the busied call further comprising a step of identifying available communication resources for use in the second active call.

11. The method of claim 7, the step of linking the busied call to the at least one active call further comprising a step of establishing a general contention indication in a call record for the at least one active call.

12. The method of claim 7, the step of linking the busied call to the at least one active call further comprising a step of establishing a pointer in a call record for the at least one active call that ultimately points to at least a call record for the busied call.

13. The method of claim 7, the step of linking the busied call to the at least one active call further comprising a step of establishing a pointer in a call record for the busied call that ultimately points to at least a call record for the at least one active call.

14. The method of claim 7, the step of linking the busied call to the at least one active call further comprising a step of establishing a pointer in an entity record for a called entity participating in the at least one active call that ultimately points to at least a call record for the busied call.

15. The method of claim 7, wherein the call request is for a private call.

16. The method of claim 7, wherein the call request is for a talkgroup call.

17. The method of claim 7, wherein the call request is for a multigroup call.

18. In a wireless communication system comprising a plurality of communication entities that communicate with each other via a plurality of wireless communication resources, wherein the plurality of wireless communication resources are allocated among the plurality of communication entities by a system controller, a method for the system controller to convert a busied call, the method comprising steps of:

receiving a call request from a calling entity of the plurality of communication entities, wherein the call request is directed to a called entity of the plurality of communication entities;

determining that the call request is in contention with a first active call, wherein the called entity is participating in the first active call;

placing the call request in a busy queue to produce the busied call;

linking the busied call to the first active call via a logical link;

detecting that the first active call has terminated;

determining that the busied call was in contention with the first active call via the logical link; and converting the busied call to a second active call, wherein the calling entity and the called entity participate in the second active call.

19. The method of claim 18, wherein the calling entity is a communication unit.

20. The method of claim 19, wherein the called entity is another communication unit.

21. The method of claim 19, wherein the called entity is a talkgroup.

22. The method of claim 18, wherein the calling entity is a multigroup.

23. The method of claim 22, wherein the called entity is a talkgroup.

* * * * *